(12) United States Patent
Gutnik et al.

(10) Patent No.: US 9,165,170 B1
(45) Date of Patent: Oct. 20, 2015

(54) RFID TAG DYNAMICALLY ADJUSTING CLOCK FREQUENCY

(71) Applicant: Impinj, Inc., Seattle, WA (US)

(72) Inventors: Vadim Gutnik, Irvine, CA (US); Scott A. Cooper, Seattle, WA (US); John D. Hyde, Corvallis, OR (US); Theron Stanford, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 14/709,331

(22) Filed: May 11, 2015

Related U.S. Application Data

(63) Continuation of application No. 13/462,343, filed on May 2, 2012, now Pat. No. 9,064,196, which is a continuation-in-part of application No. 12/403,344, filed on Mar. 12, 2009, now Pat. No. 8,193,912.

(60) Provisional application No. 61/036,422, filed on Mar. 13, 2008.

(51) Int. Cl.
*H04Q 5/22* (2006.01)
*G06K 7/10* (2006.01)
*G06K 7/016* (2006.01)

(52) U.S. Cl.
CPC ............ *G06K 7/10207* (2013.01); *G06K 7/016* (2013.01)

(58) Field of Classification Search
USPC .................. 340/10.1–10.6, 572.1–572.9; 235/375–385
See application file for complete search history.

(56) References Cited

U.S. PATENT DOCUMENTS

| 5,482,139 | A | 1/1996 | Rivalto |
| 5,504,485 | A * | 4/1996 | Landt et al. ............. 342/42 |
| 6,535,132 | B2 | 3/2003 | Waters et al. |
| 6,809,762 | B1 | 10/2004 | Donnelly et al. |
| 7,024,180 | B2 | 4/2006 | Waters et al. |
| 7,272,456 | B2 | 9/2007 | Farchmin et al. |
| 7,376,391 | B2 | 5/2008 | Friedrich et al. |
| 7,546,551 | B2 | 6/2009 | Sakata et al. |
| 7,665,040 | B2 | 2/2010 | Nakamura |
| 7,986,653 | B2 | 7/2011 | Friedrich |
| 8,004,704 | B2 | 8/2011 | Shimoichi |
| 8,131,914 | B2 | 3/2012 | Kruecken |

(Continued)

FOREIGN PATENT DOCUMENTS

| EP | 714043 A1 | 5/1995 |
| EP | 1071045 A1 | 1/2001 |

(Continued)

OTHER PUBLICATIONS

Notice of Allowance received for U.S. Appl. No. 12/403,344 mailed Feb. 3, 2012.

*Primary Examiner* — Kerri McNally
*Assistant Examiner* — Paul Obiniyi
(74) *Attorney, Agent, or Firm* — Turk IP Law, LLC

(57) ABSTRACT

An RFID tag is configured to adjust its current clock frequency to conserve tag power while receiving a reader signal and/or backscattering a signal. The tag may determine whether to adjust its current clock frequency based on one or more timing parameters, which may be determined from a reader command and/or from a signal to be backscattered. The counting rate and/or limit of a tag counter and/or the power supplied to a tag component may also be adjusted. The current tag clock frequency may be adjusted during the signal reception/backscattering process and optionally restored once the process is completed.

18 Claims, 18 Drawing Sheets

RFID SYSTEM

(56) References Cited

U.S. PATENT DOCUMENTS

| | | | |
|---|---|---|---|
| 8,193,912 B1* | 6/2012 | Gutnik et al. | 340/10.1 |
| 8,315,391 B2* | 11/2012 | Inano et al. | 380/273 |
| 8,471,642 B2* | 6/2013 | Hill | 331/117 R |
| 2002/0008626 A1 | 1/2002 | Waters et al. | |
| 2002/0013144 A1 | 1/2002 | Waters et al. | |
| 2002/0013914 A1* | 1/2002 | Posch et al. | 713/600 |
| 2003/0214532 A1 | 11/2003 | Nakamura | |
| 2004/0075735 A1 | 4/2004 | Marmaropoulos | |
| 2004/0100383 A1 | 5/2004 | Chen et al. | |
| 2005/0018639 A1* | 1/2005 | Friedrich et al. | 370/338 |
| 2005/0053024 A1* | 3/2005 | Friedrich | 370/313 |
| 2005/0283804 A1 | 12/2005 | Sakata et al. | |
| 2005/0289478 A1 | 12/2005 | Landman et al. | |
| 2006/0028400 A1* | 2/2006 | Lapstun et al. | 345/8 |
| 2006/0163370 A1* | 7/2006 | Diorio et al. | 235/492 |
| 2006/0176508 A1 | 8/2006 | Sugahara | |
| 2007/0070387 A1 | 3/2007 | Kim | |
| 2007/0070397 A1 | 3/2007 | Shimoichi | |
| 2007/0176755 A1* | 8/2007 | Fischer et al. | 340/10.34 |
| 2007/0188305 A1* | 8/2007 | Drucker | 340/10.4 |
| 2007/0221737 A2 | 9/2007 | Diorio et al. | |
| 2007/0277124 A1 | 11/2007 | Shin et al. | |
| 2008/0006702 A2 | 1/2008 | Diorio et al. | |
| 2008/0036757 A1 | 2/2008 | Furukawa et al. | |
| 2008/0079549 A1* | 4/2008 | Yamada et al. | 340/10.5 |
| 2008/0189173 A1 | 8/2008 | Bakar et al. | |
| 2008/0278293 A1* | 11/2008 | Drucker | 340/10.4 |
| 2008/0278329 A1* | 11/2008 | Kim et al. | 340/572.4 |
| 2008/0309490 A1* | 12/2008 | Honkanen et al. | 340/572.1 |
| 2009/0009293 A1 | 1/2009 | Drucker | |
| 2009/0106487 A1* | 4/2009 | Kruecken | 711/103 |
| 2009/0171786 A1* | 7/2009 | Kuo et al. | 705/14 |

FOREIGN PATENT DOCUMENTS

| | | |
|---|---|---|
| JP | 07013536 A | 1/1995 |
| JP | 07210137 A | 8/1995 |
| JP | 07281294 A | 10/1995 |
| JP | 08161596 A | 6/1996 |
| JP | 2006013938 A | 1/2006 |

* cited by examiner

SIGNAL PATH DURING R→T

SIGNAL PATH DURING T→R

UNADJUSTED TAG
FREQUENCIES

INCREASE OF TAG
FREQUENCIES BASED ON
DEVIATION FROM COMMANDED
REPLY FREQUENCY

*DECREASE OF TAG FREQUENCIES BASED ON DEVIATION FROM COMMANDED REPLY FREQUENCY*

*EXAMPLE TAG CIRCUITRY*

RFID TAG DYNAMICALLY ADJUSTING CLOCK FREQUENCY

CROSS REFERENCE TO RELATED APPLICATIONS

This application is a continuation under 35 U.S.C. §120 of co-pending U.S. patent application Ser. No. 13/462,343 filed on May 2, 2012, which is a continuation-in-part (CIP) of U.S. Pat. No. 8,193,912 issued on Jun. 5, 2012 that claims the benefit under 35 U.S.C. §119(e) of U.S. Provisional Application Ser. No. 61/036,422 filed on Mar. 13, 2008. The disclosures of the U.S. patent application, the U.S. Patent, and the U.S. Provisional Application are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on.

An RFID tag typically includes an antenna system, a radio section, a power management section, and frequently a logical section, a memory, or both. In some RFID tags the logical section may include a cryptographic algorithm which, in many instances, relies on one or more passwords or keys stored in tag memory. In earlier RFID tags the power management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device and are called passive tags. Of course, even passive tags typically include temporary energy- and data/flag-storage elements such as capacitors or inductors.

An RFID reader commands the tags within its field of view which frequency they are supposed to use in backscattering to the reader. A tag generates the commanded or desired backscatter frequency by dividing its internal oscillator frequency typically by an integer number. Higher oscillator frequencies give tags more options to divide the oscillator frequency by an integer and derive a backscatter frequency close to the commanded or desired backscatter frequency. However, higher internal clock frequencies also mean higher power consumption for the tag, which is available in limited quantities only.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag configured to adjust its clock frequency while receiving a reader command and/or backscattering a signal. The tag may be configured to adjust its clock frequency in order to conserve tag power. According to some embodiments, the tag may determine whether to adjust its current clock frequency based on one or more timing parameters. The timing parameters may be determined from a reader command and/or from a signal to be backscattered. The current tag clock frequency may be adjusted during the command reception/signal backscattering process and optionally restored once the process is completed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
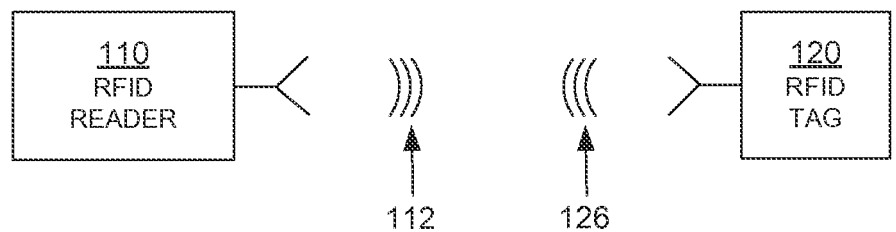
FIG. 1 is a block diagram of components of an RFID system.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
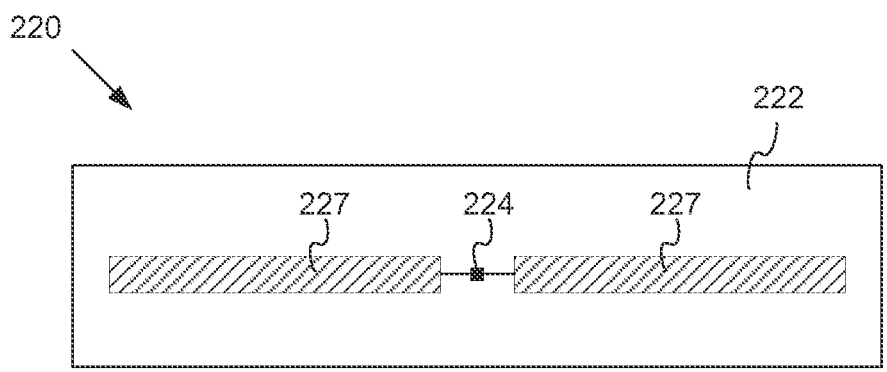
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is often formed on a substantially planar inlay 222, which can be made in many ways known in the art. Tag 220 includes an electrical circuit, which is preferably although not necessarily implemented as an integrated circuit (IC) 224. IC 224 is arranged on inlay 222.

Tag 220 also includes an antenna for exchanging wireless signals with its environment. The antenna is often flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna and communicated to IC 224. IC 224 both harvests power, and responds if appropriate, based on the incoming signal and its internal state. When responding via backscatter, IC 224 modulates the reflectance of the antenna, which generates a backscatter signal from a wave transmitted by the reader. Coupling together and uncoupling the antenna ports of IC 224 can modulate the antenna reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
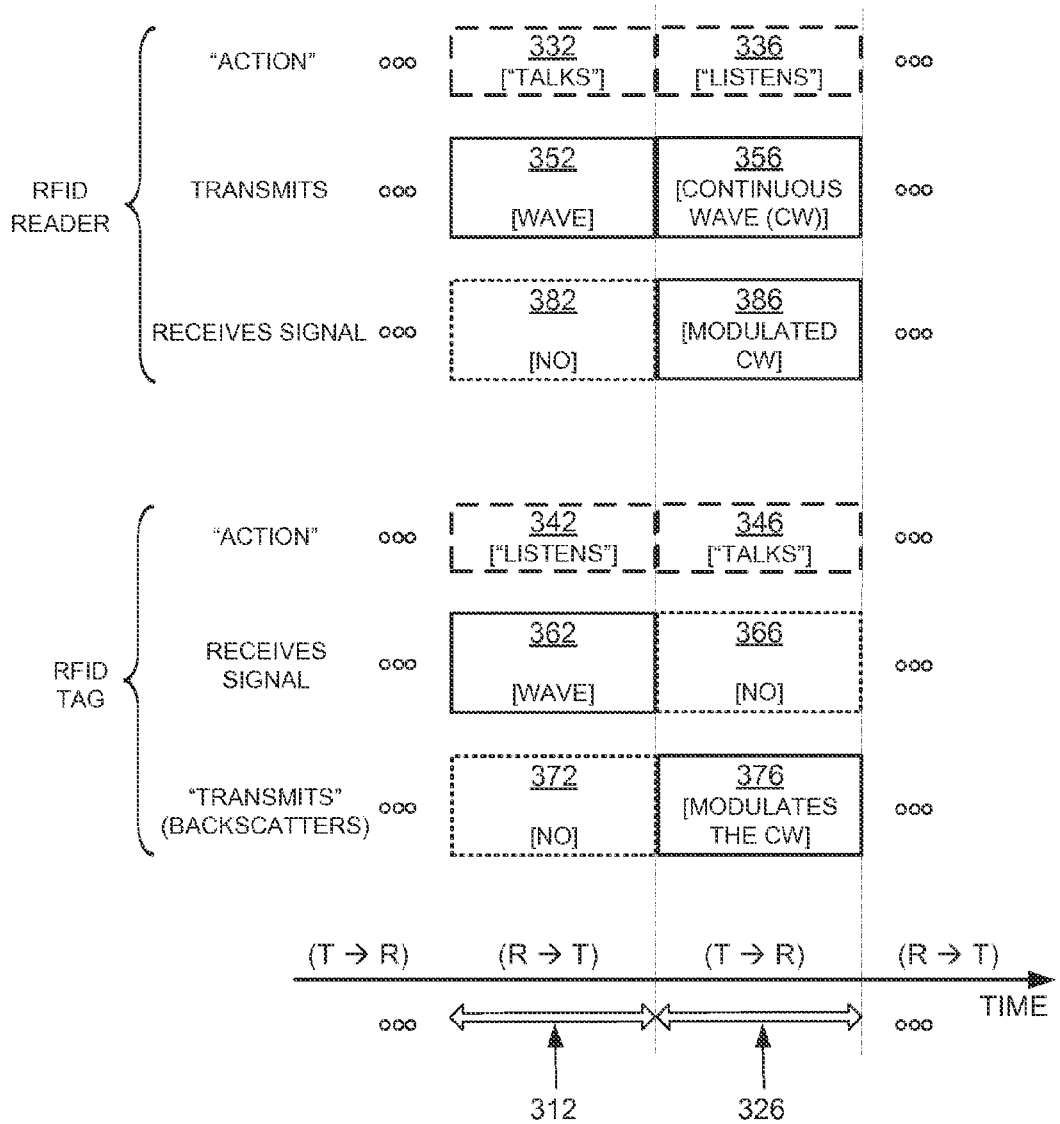
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on.

Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Specification". The Gen2 Specification has been ratified by EPCglobal, which is an organization that maintains a website at: <http://www.gs1.orgepcglobal/> at the time this document is initially filed with the USPTO. Versions 1.1.0 and 1.2.0 of the Gen2 Specification are hereby incorporated by reference in their entirety.

In addition, a protocol can be a variant of a stated specification such as the Gen2 Specification, for example including fewer or additional commands than the stated specification calls for, and so on. In such instances, additional commands are sometimes called custom commands.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A reader commands a tag its reply frequency (backscatter frequency) employing a Tag-To-Reader calibration symbol or TRcal. The TRcal symbol is typically included in the preamble transmitted by the reader. The reader may further provide the tag with a divide ratio (DR) in a payload of a Query command that initiates an inventory round. The tag measures TRcal(time) using its clock frequency and then determines TRcal(count) by computing TRcal(time)*f (internal clock frequency). TRcal(count) is used by the tag to calculate an integer, N, dividing TRcal(count) to DR and computing a rounded number from the division. In many tags, the tag's internal clock frequency divided by that integer number, N, to arrive at the actual reply (backscatter) frequency.

Figure 4:
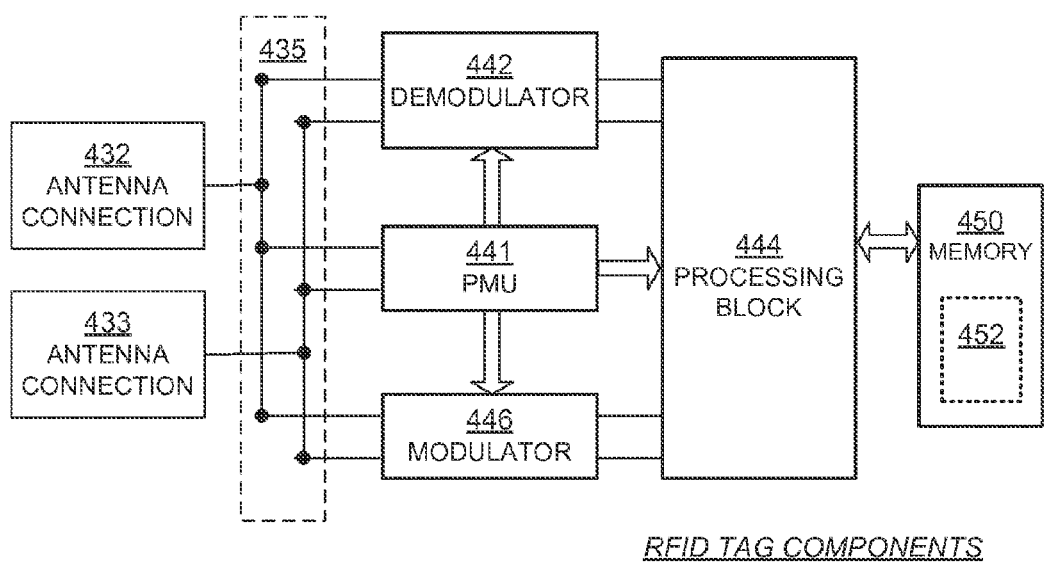
FIG. 4 is a block diagram showing a detail of an RFID tag, such as the one shown in FIG. 1.

FIG. 4 is a block diagram showing a detail of an RFID tag, such as the one shown in FIG. 1. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Power Management Unit (PMU) 441. PMU 441 may be implemented in any way known in the art, for harvesting raw RF power received via antenna connections 432, 433. In some embodiments. PMU 441 includes at least one rectifier, and so on.

In operation, an RF wave received via antenna connections 432, 433 is received by PMU 441, which in turn generates power for components of circuit 424. This is true for either or both reader-to-tag (R→T) and tag-to-reader (T→R) sessions, whether or not received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an RFID tag.

Figure 5A:
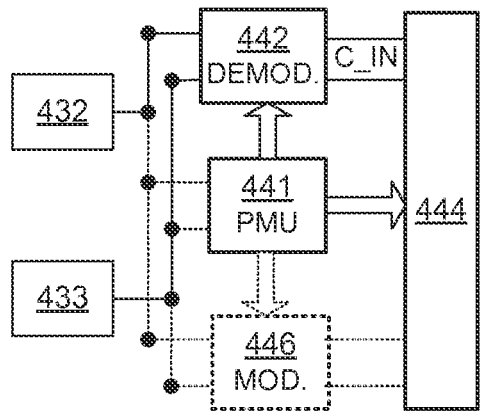
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received from antenna connections 432, 433, and then a signal is demodulated from demodulator 442, and then input to processing block 444 as C_IN. In one embodiment, C_IN may include a received stream of symbols.

Version 524-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
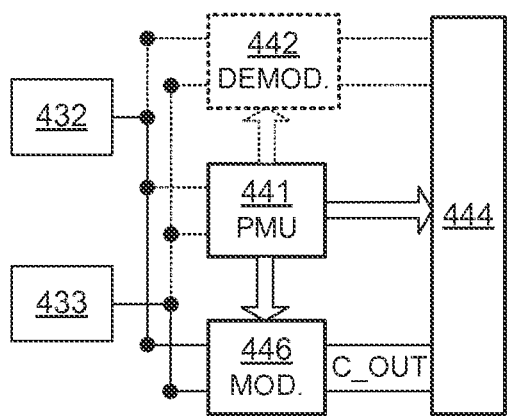

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a transmission stream of symbols. C_OUT is then modulated by modulator 446, and output as an RF wave via antenna connections 432, 433.

Version 524-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
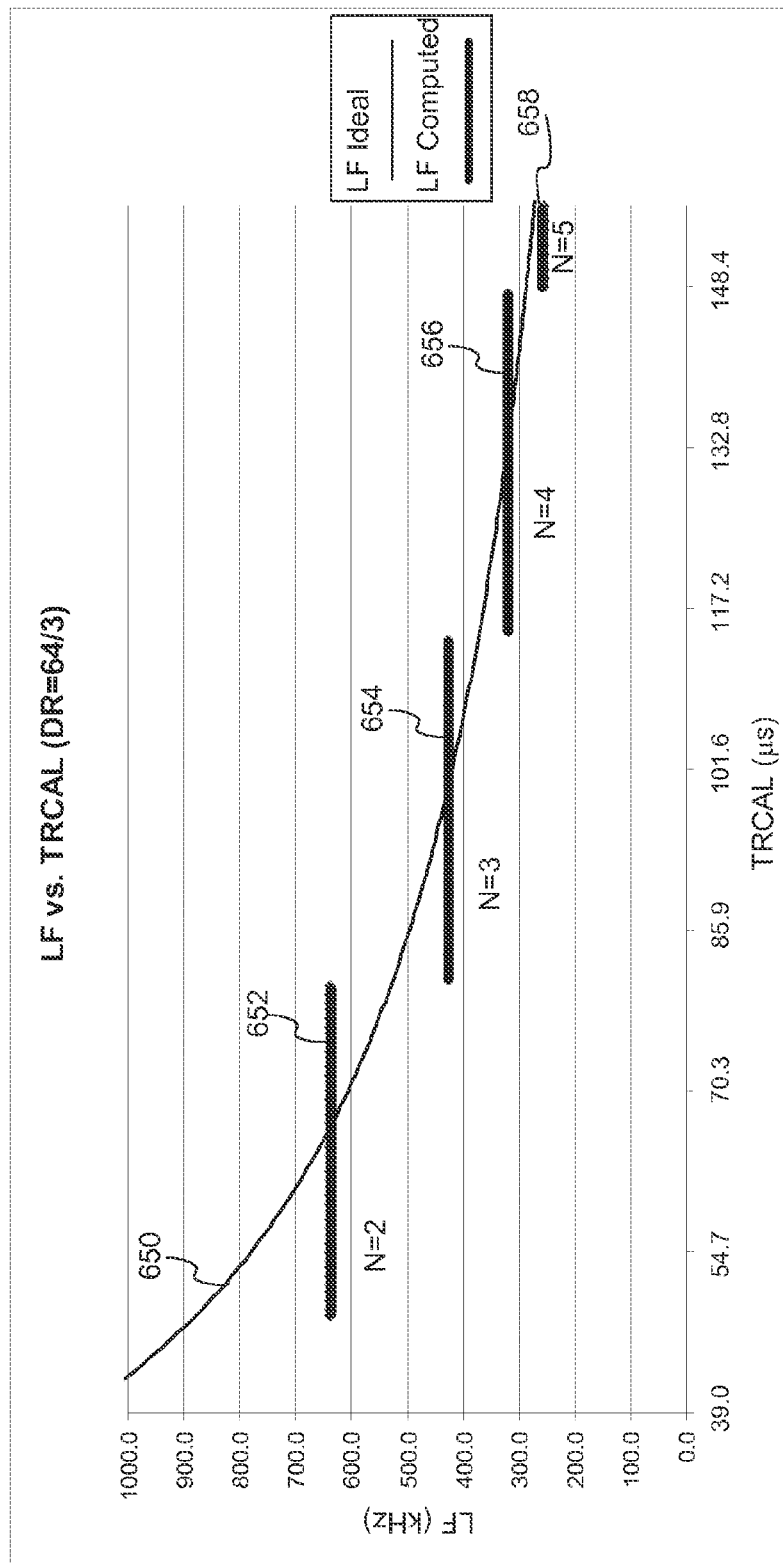
FIG. 6 is a diagram illustrating an ideal commanded backscatter frequency and ranges of computed backscattered frequencies derived by dividing the tag's internal oscillator frequency by different integer numbers.

FIG. 6 is a diagram illustrating an ideal commanded backscatter frequency and ranges of computed backscattered frequencies derived by dividing the tag's internal oscillator frequency by different integer numbers.

As discussed previously, a reader commands a tag its backscatter frequency through a TRcal symbol included in a preamble of a Query command and a divide ratio DR included in a payload of the Query command. The tag determines the base frequency from duration of the TRcal symbol, then computes DR/TRcal ratio to arrive at the reader commanded reply frequency $LF_{IDEAL}$. DR may have a value of 8 or 64/3 in tags compliant with the Gen 2 Specification described above.

In practice, the tag measures TRcal using its internal oscillator and determining TRcal(counts) as $f_{oscillator}$*TRcal (time). Some tags then determine an integer number, N, (e.g. N=Floor(TRcal/DR+9/16)) and dividing its internal oscillator frequency by the integer number to arrive at the computed reply frequency $LF_{COMPUTED}$ ($LF_{COMPUTED}=f_{oscillator}/N$).

Since tag oscillator frequencies may vary for a number of reasons (oscillator type, temperature, etc.), the computed reply frequencies are usually within a predefined range of the reader commanded tag reply frequency $LF_{IDEAL}$. Indeed, standards such as the Gen2 Specification define limits for tag reply frequencies based on the ideal reply frequency as error rates.

Diagram 600 illustrates reader commanded reply frequency $LF_{IDEAL}$ (650) and ranges for actual tag reply frequencies based on different integer numbers, N, that may be computed by the tag ($LF_{COMPUTED}$). The frequencies are shown based on TRcal(time) values that may be measured by the tag.

For example, for N=2, the tag may reply within range 652. Similarly, for N=3, the tag may reply in range 654, for N=4, the tag may reply in range 656, for N=5, the tag may reply in range 658, and so on. The integer number, N, is determined based on the tag's oscillator frequency for a given $LF_{IDEAL}$.

It should be noted that for higher tag oscillator frequencies, potentially more reply frequencies are available to a tag making it easier for the tag to employ an $LF_{COMPUTED}$ that is closer to the $LF_{IDEAL}$. For example, a tag with 1920 kHz internal oscillator can backscatter at 1920/3=640 kHz, 1920/4=480 kHz, 1920/5=384 kHz, and so on. Worst-case fractional error for this tag is at 560 kHz: (560-480)/560=14.2% based on a reader commanded reply frequency of 560 kHz. Another tag with a 1280 kHz oscillator can backscatter at 1280/2=640 kHz, 1280/3=427 kHz, 1280/4=320 kHz, and so on. Worst-case fractional error for this tag is at 533 kHz: (533-427)/533=20% (or (533-640)/640=−20%) for a reader commanded frequency of 533 kHz. Thus, the higher the tag frequency, the smaller the tag's reply frequency error. However, higher tag frequencies mean higher power consumption for the tag. Since passive RFID tags receive their power from the RF signal transmitted by the reader, and that power is limited in quantity, lower tag oscillator frequencies are preferred for power conservation purposes.

Embodiments also include methods. An economy is achieved in the present document in that a single description is sometimes given for both methods according to embodiments, and functionalities of devices made according to embodiments. Plus, a single set of flowcharts is sometimes used to describe methods in and of themselves, along with operations of hardware and/or software and/or firmware where applicable. This is regardless of how each element is implemented.

Embodiments may additionally include programs, and methods of operation of the programs such as algorithms executed by a processing block of a tag according to embodiments. For example, the algorithms may be used to determine an adjusted reply frequency for the tag based on the tag's clock frequency and a reader commanded reply frequency as discussed herein. The algorithms may also be used to determine an adjusted tag clock frequency based on one or more timing parameters as discussed herein. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a tag with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present disclosure.

Some methods described herein are for the operation of RFID tags, and of chips that are intended for use with RFID tags, whether IC chips, or made from organic semiconductors, etc. These methods can be implemented in any number of ways, including the structures described in this document.

Figure 7:
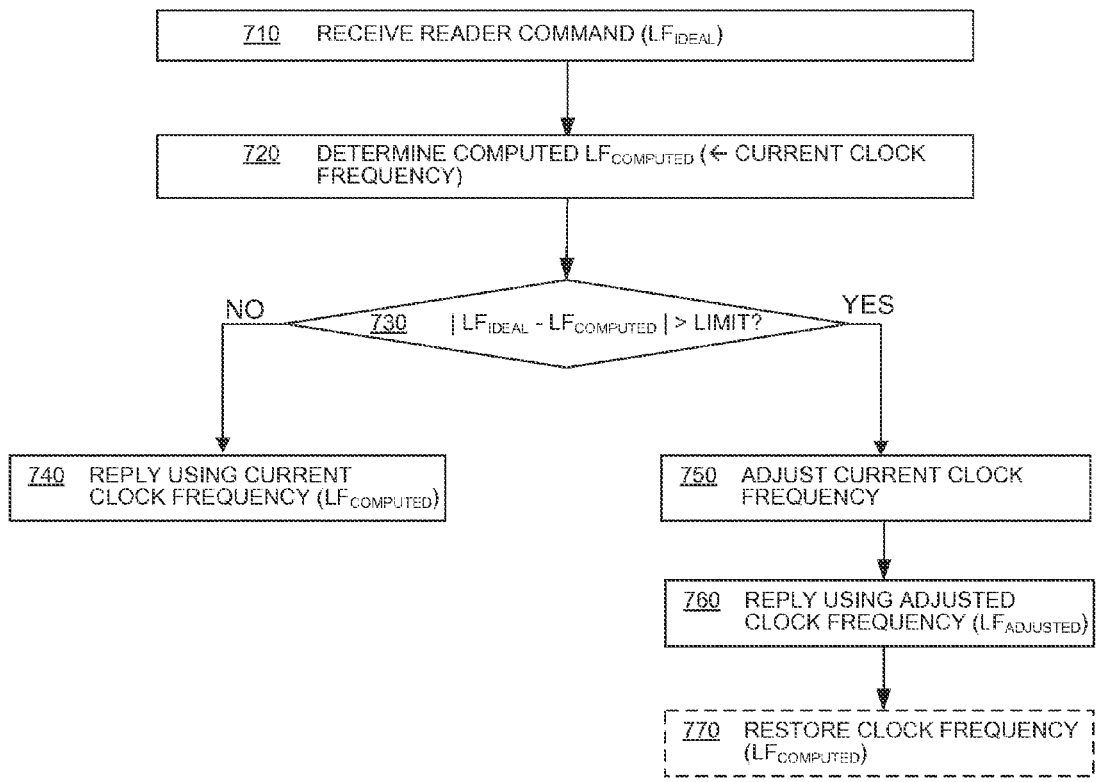
FIG. 7 is a flowchart for a process of dynamically adjusting tag clock frequency according to embodiments.

FIG. 7 is a flowchart for a process of dynamically adjusting tag clock frequency according to embodiments. As mentioned previously, higher clock frequencies in tags enable the tags to reply with frequencies closer to the reader commanded reply frequency reducing frequency errors. On the other hand, high clock frequencies result in increased power consumption at the tag. In a tag according to embodiments, the main clock frequency of the tag may be adjusted during a portion of the tag operation such as backscattering to minimize the backscattering frequency error.

Process 700 begins with the tag receiving a reader command such as a Query command dictating to the tag its reply frequency ($LF_{IDEAL}$) at operation 710. At following operation 720, the tag determines its reply frequency, $LF_{COMPUTED}$, based on its current clock frequency and the $LF_{IDEAL}$. The $LF_{COMPUTED}$ is determined from a TRCAL value of the reader command and the divide ratio, DR, as described previously. According to one embodiment, this may be accomplished by determining an integer number and a remainder through dividing the current clock frequency of the tag by the $LF_{IDEAL}$. The tag may then determine the $LF_{COMPUTED}$ based on dividing the current clock frequency of the tag by the integer number.

In an example implementation of the embodiments, the integer number, N, may be computed as:

$$N = \left[ \frac{TRcal(time) * f_{oscillator} + \text{offset}}{DR} \right]_{INT}, \quad [1]$$

where
TRcal(time) is a time based value of the duration of TRcal symbol as measured by the tag;
$f_{oscillator}$ is the tag's clock frequency;
offset is a predefined offset value for shifting the frequency as needed; and
DR is the reader defined divide ratio.

At decision operation 730, a determination is made whether a difference between $LF_{IDEAL}$ and $LF_{COMPUTED}$ exceeds a predefined limit. The predefined limit may be a standard based limit such as Gen 2 Specification. If $LF_{COMPUTED}$ is within the prescribed limit, the tag may backscatter a reply signal using $LF_{COMPUTED}$ based on the current clock frequency at operation 740.

If the predefined limit is exceeded, the current clock frequency may be adjusted at operation 750. The adjustment may include incrementing or decrementing the current clock frequency based on whether $LF_{IDEAL}$ is larger or smaller than $LF_{COMPUTED}$. The adjustment may also be performed based on computing a remainder of the division performed at equation [1], employing a look-up table, or using a predefined function to determine a "boost factor" for incrementing or decrementing the clock frequency. The adjustment may be "coarse" (i.e. using relatively small number of frequency adjustment values) or "fine" (i.e. using a relatively large number of frequency adjustment values).

According to other embodiments, the adjustment may further include modifying the integer number computed at equation [1]. According to further embodiments, the current clock frequency may be adjusted such that the $LF_{IDEAL}$ is a non-integer multiple of the $LF_{ADJUSTED}$.

At operation 760, the tag backscatters to the reader a reply signal using the adjusted frequency $LF_{ADJUSTED}$. The tag's clock frequency may be restored to its original value upon completion of the backscattering at optional operation 770. While the clock frequency adjustment may be performed during the backscattering period, embodiments are not limited to adjustment during this operational period. The tag may modify its clock frequency prior to backscattering and restore upon expiration of a preset period after the backscattering is completed.

The operations included in process 700 are for illustration purposes. Adjusting a tag's clock frequency for power conservation may be implemented by similar processes with fewer or additional steps, as well as in different order of operations using the principles described herein.

Figure 8:
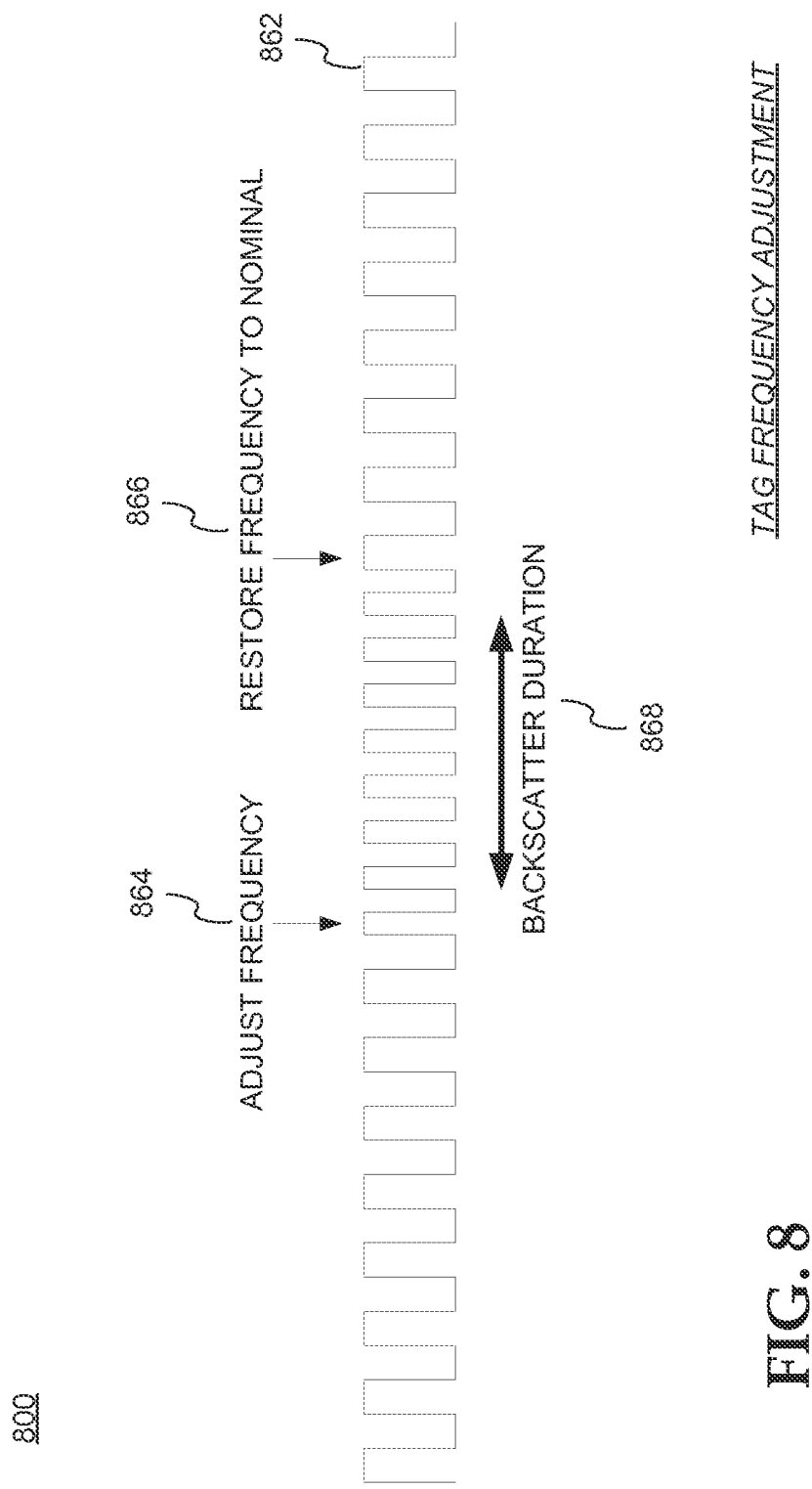
FIG. 8 illustrates adjustment of tag clock frequency during backscatter period in a tag according to one embodiment.

FIG. 8 illustrates adjustment of tag clock frequency during backscatter period in a tag according to one embodiment. While the tag clock frequency may be increased or decreased according to embodiments, the main clock frequency may be set to a low value to conserve tag power according to one embodiment. According to the same embodiment, the clock frequency may be increased temporarily to derive an accurate tag reply frequency ($LF_{ADJUSTED}$) during backscattering and restored to its original value once the backscattering is completed as shown in diagram 800.

Thus, tag clock frequency 862 is adjusted (increased) (864) shortly prior to backscattering 868 and restored to its nominal value (866) when the backscattering duration 868 is finished. This way, the tag consumes less power with the lower clock frequency when it is not backscattering while minimizing its reply frequency error through the frequency adjustment.

Figure 9A:
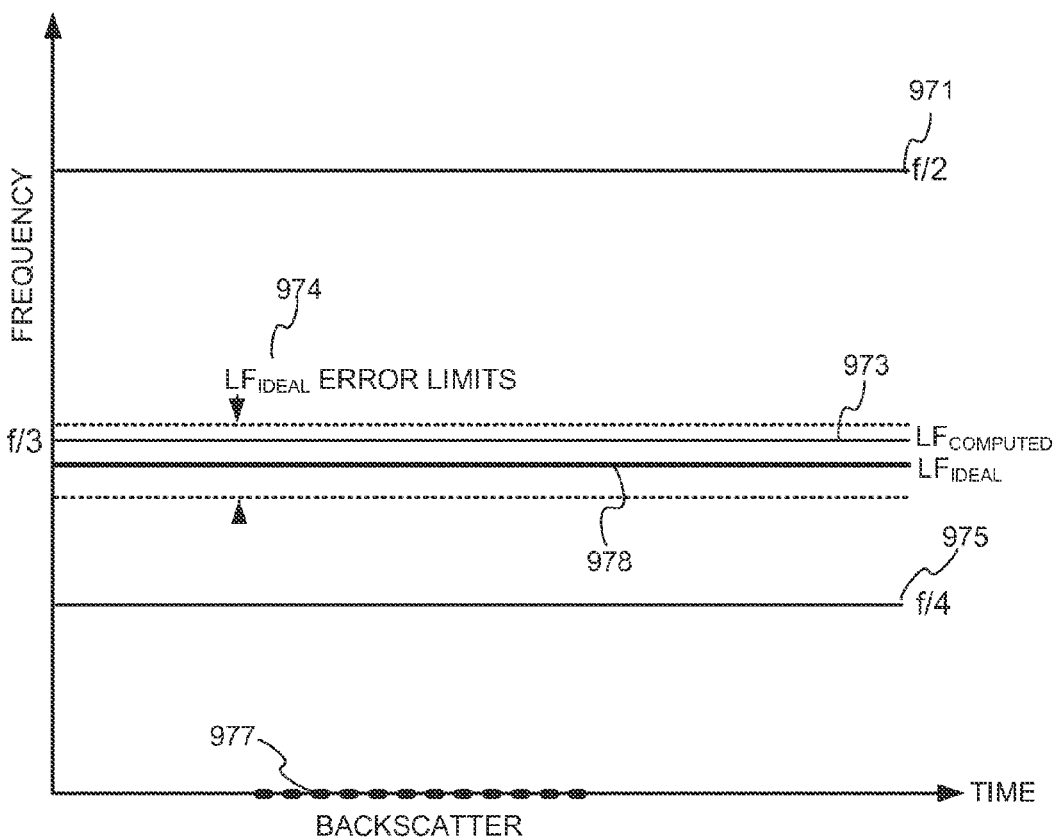
FIG. 9A illustrates how tag clock frequency may be left without adjustment when an expected variation of the computed backscatter frequency from the commanded backscatter frequency is within specified limits in a tag according to embodiments.

FIG. 9A illustrates how tag clock frequency may be left without adjustment when an expected variation of the computed backscatter frequency from the commanded backscatter frequency is within specified limits in a tag according to embodiments.

Reader commanded tag reply frequency may vary depending on the system, reader type, regulatory requirements, and other reasons. As discussed previously, standards such as the Gen2 Specification define limits for tags reply frequencies. Thus, for each reader commanded tag reply frequency, there is a range of frequencies that may be used by the tag to backscatter at and still comply with the requirements. In diagram 970, this range of acceptable reply frequencies is shown as the range within $LF_{IDEAL}$ error limits 974, where $LF_{IDEAL}$ 978 is the reader commanded reply frequency. Available tag reply frequencies based on the tag's internal clock frequency include f/2 (971), f/3 (973) and f/4 (975). Since f/3 (973) is already within the acceptable range, the tag determines that frequency as $LF_{COMPUTED}$ and does not need to change f in order to comply with the frequency requirement outside or during backscattering period 977.

The adjustment of tag frequency according to some embodiments may be dynamic. As discussed above, the tag may maintain its clock frequency if no change is needed. On the other hand, the tag may determine $LF_{IDEAL}$ to be outside one of its derived frequency ranges and adjust the clock frequency to generate an accurate reply frequency.

Figure 9B:
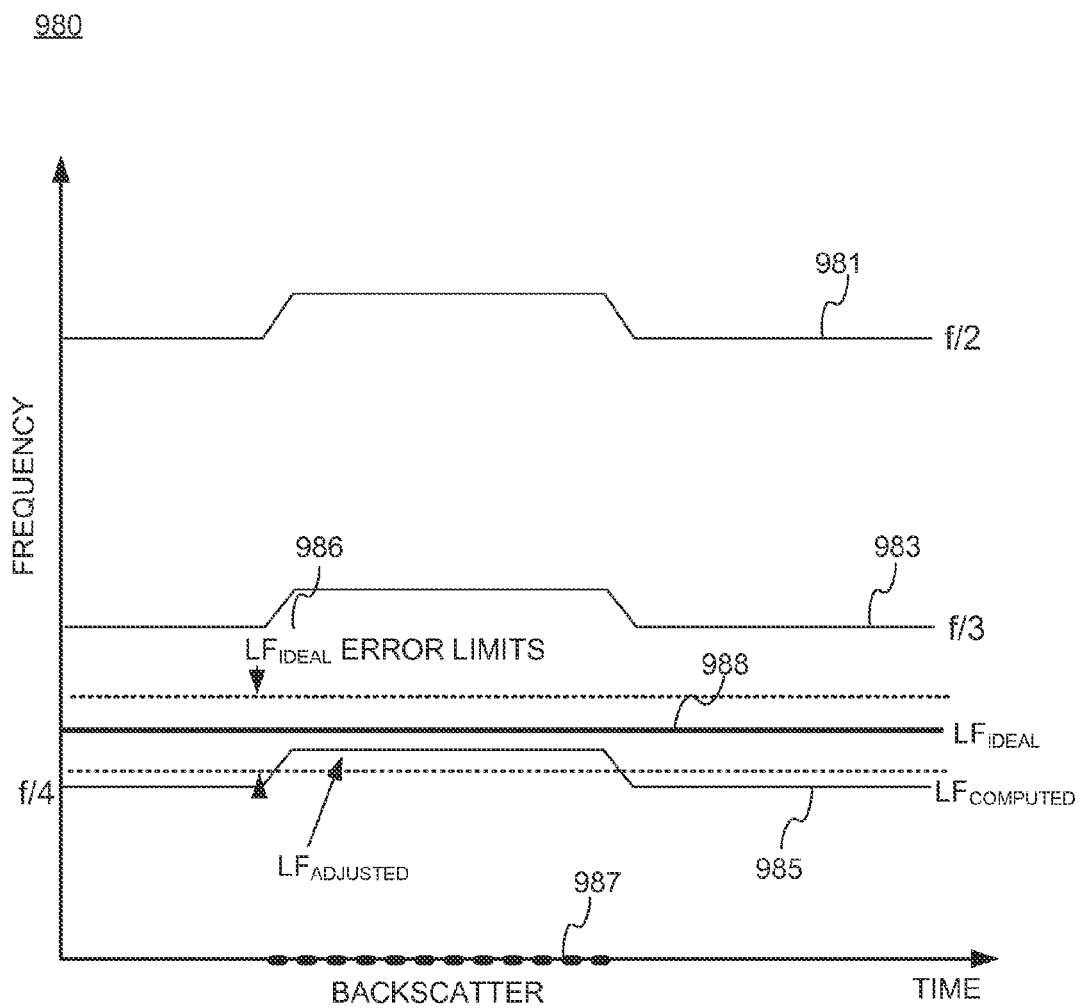
FIG. 9B illustrates how tag clock frequency may be increased depending on the expected variation of the computed backscatter frequency from the commanded backscatter frequency in a tag according to embodiments.

FIG. 9B illustrates how tag clock frequency may be increased depending on the expected variation of the computed backscatter frequency from the commanded backscatter frequency in a tag according to embodiments.

In diagram 980, available example tag reply frequencies f/2 (981), f/3 (983) and f/4 (985) are all outside the acceptable reply frequency range 986 based on reader commanded reply frequency $LF_{IDEAL}$ 988. Thus, the tag may adjust its internal clock frequency such that one the available reply frequencies, f/4 (985) is within the acceptable range during backscattering period 987 and used as $LF_{ADJUSTED}$. Outside the backscattering period 987, the frequency is restored to its normal value ($LF_{COMPUTED}$). The modification in this example scenario is an increase of the frequency. Indeed, there are two mechanisms assisting the tag to comply with the reply frequency limits here. The first one is the selection of the integer, N(=4), for determining which fraction of the internal clock frequency is to be used for reply frequency. The second mechanism is the adjustment of the selected fraction during the backscatter period to further bring the reply frequency into compliance with the reader commanded reply frequency requirement(s).

Figure 9C:
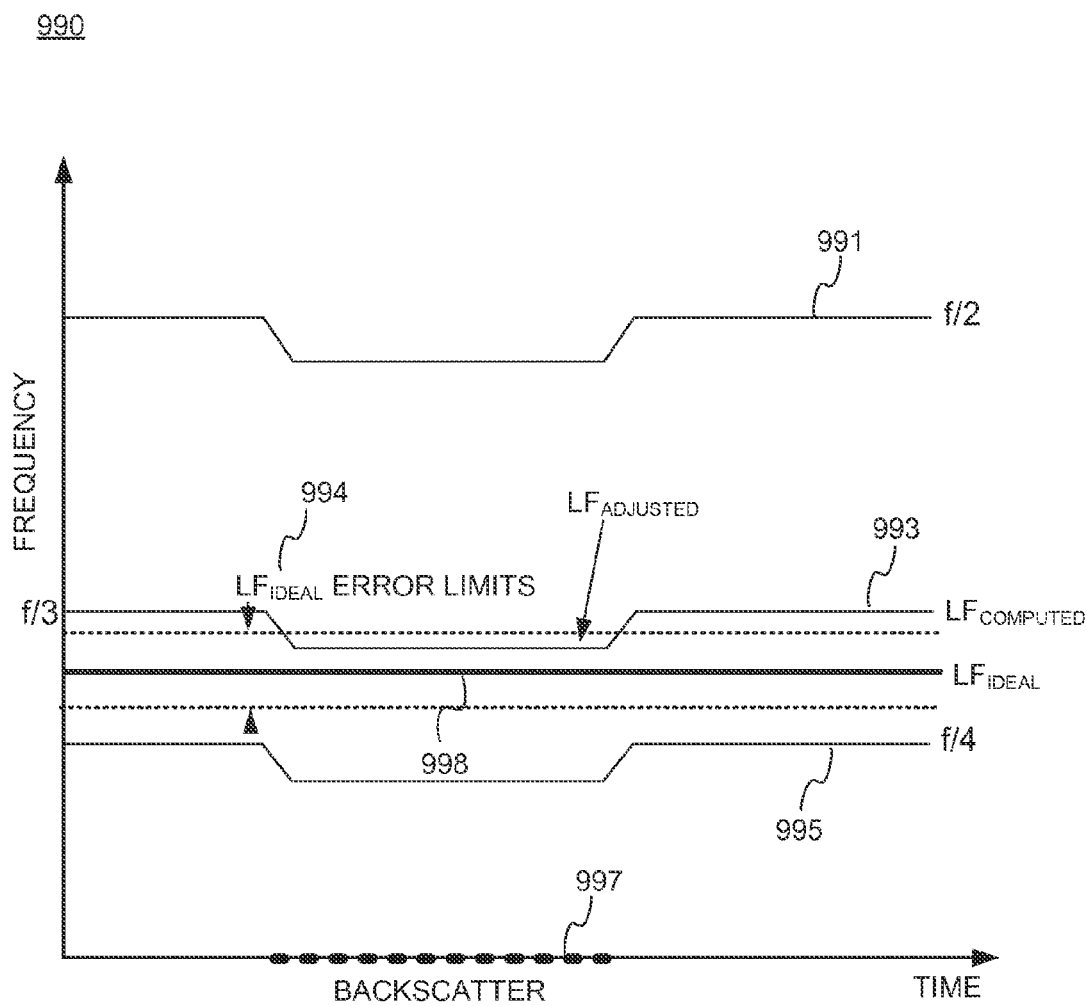
FIG. 9C illustrates how tag clock frequency may be decreased depending on the expected variation of the computed backscatter frequency from the commanded backscatter frequency in a tag according to embodiments.

FIG. 9C illustrates how tag clock frequency may be decreased depending on the expected variation of the computed backscatter frequency from the commanded backscatter frequency in a tag according to embodiments.

Diagram 990 is similar to diagram 980 illustrating adjustment of available example tag reply frequencies f/2 (991), f/3 (993), and f/4 (995), where the reader commanded frequency $LF_{IDEAL}$ (998) and its range of acceptable reply frequencies (994) do not coincide with any of the unadjusted available reply frequencies. Differently from diagram 980, the tag decreases the internal clock frequency and corresponding available reply frequencies resulting in f/3 (993) being selected as the $LF_{COMPUTED}$ and its adjusted version $LF_{ADJUSTED}$ during the backscatter period 997.

The adjustments shown in diagrams 980 and 990 include restoration of the tag clock frequency at the end of the backscattering period. Embodiments are not so limited, however. According to some embodiments, the adjusted clock frequency may remain at its adjusted value even after the backscatter period. According to other embodiments, the tag may lower its clock frequency earlier than the beginning of the backscatter period (e.g. upon detecting a low data rate from the reader). According to further embodiments, the change in clock frequency may be in increments or decrements at multiple steps before, during, and after the backscatter period.

Figure 10:
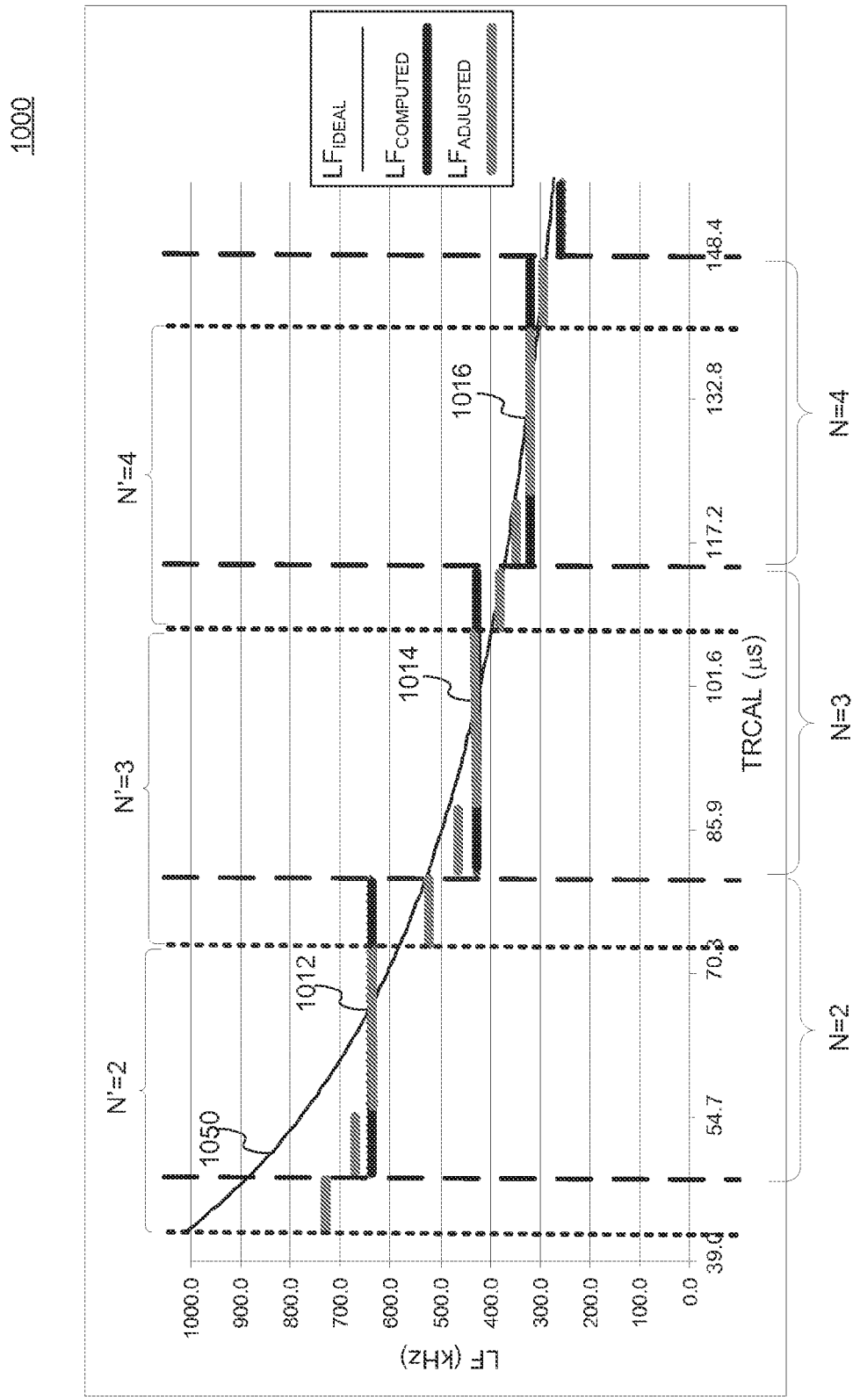
FIG. 10 is a diagram illustrating an improvement of computed tag backscatter frequencies with clock adjustment in a tag according to embodiments.

FIG. 10 is a diagram illustrating an improvement of computed tag backscatter frequencies with clock adjustment in a tag according to embodiments. Diagram 1000 shows reader commanded tag reply frequency. $LF_{IDEAL}$ 1050, across TRcal (time) axis as in diagram 600 of FIG. 6. As discussed in FIG. 6, fixed ranges of reply frequencies for $LF_{COMPUTED}$ are shown as dark bars, which may result in reply frequency errors outside the predefined limits for some N values.

According to embodiments, the error in tag reply frequency may be minimized in two ways: (1) modification of the computation of N as discussed above may reduce the error as presented by the lighter colored multiple steps of reply frequencies as opposed to previous single set of frequencies for each N (e.g. 1012, 1014, 1016, and 1018); and (2) the adjustment of tag clock frequency may reduce the error further as shown by the shift of reply frequency ranges along the TRcal axis (new ranges N'=2, N'=3, N'=4, etc. versus original ranges N=2, N=3, N=4, etc.). While the example diagram is shown for DR=64/3, other DR values and N computation approaches may be employed according to embodiments.

According to one example embodiment, computation of N may be modified as (where TRcal is TRcal(count)):
 if Floor(TRcal/DR)>=32
 [2]N=Floor(TRcal/DR+0.5)
 else
 [3]N=Floor(TRcal/DR+0.75)

According to another example embodiment, the clock frequency adjustment may be determined based on:
 [4] Floor(TRcal/DR) and Mod(TRcal/DR)=TRcal/DR−Floor(TRcal/DR).

These are example formulas for determining frequency adjustment and do not constitute a limitation on embodiments. Other computations may be performed with different functions, offset values, and the like according to other embodiments. Table 1 below illustrates example frequency adjustment values based on the example formula [4] above.

Figure 11:
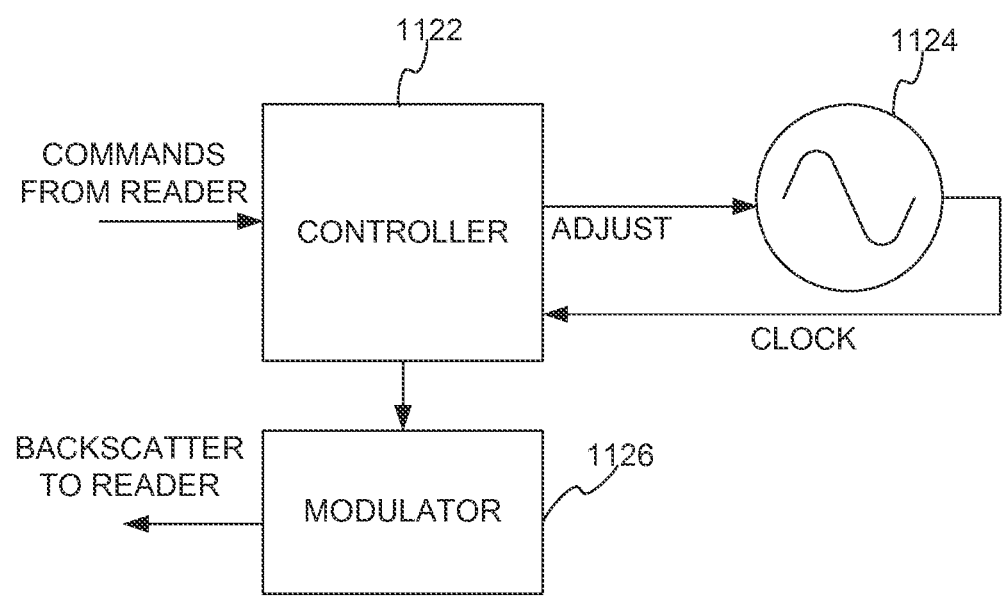
FIG. 11 illustrates example tag circuitry for adjustment of tag clock frequency according to one embodiment.

FIG. 11 illustrates example tag circuitry for adjustment of tag clock frequency according to one embodiment. Tag frequency may be generated and adjusted employing a number of different circuits. Circuit 1100 is an example implementation.

In tag circuit 1100, commands from the reader are received at controller 1122, which controls tag oscillator 1124. Upon determining an adjustment is needed as discussed previously, controller 1122 directs oscillator 1124 to adjust the clock frequency. The adjustment may include incrementing or decrementing the clock frequency. Once the controller 1122 receives the adjusted clock frequency from oscillator 1124, it derives adjusted reply frequency, $LF_{ADJUSTED}$, and instructs modulator 1126 of the tag to backscatter to the reader using $LF_{ADJUSTED}$.

TABLE 1

Example Frequency Adjustment Values
(based on TRcal(count))

| Floor(TRcal/DR) >=Value | Mod(TRcal/DR) >=Value | Frequency Adjust (%) |
|---|---|---|
| 0 | 0 | 0 |
|  | 0.25 | 10 |
|  | 0.5 | 6 |
|  | 0.75 | 0 |
| 8 | 0 | 0 |
|  | 0.25 | 6 |
|  | 0.5 | 4 |
|  | 0.75 | 0 |
| 13 | 0 | 0 |
|  | 0.25 | 4 |
|  | 0.5 | 2 |
|  | 0.75 | 0 |
| 20 | 0 | 0 |
|  | 0.25 | 2 |
|  | 0.5 | 2 |
|  | 0.75 | 0 |
| 32 | 0 | 0 |

Figure 12:
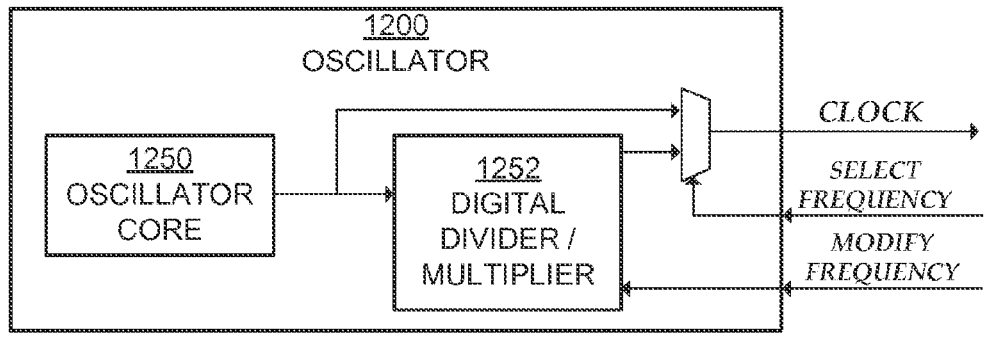
FIG. 12 illustrates several examples of circuitry for adjusting tag clock frequency according to some embodiments.
Figure 12:
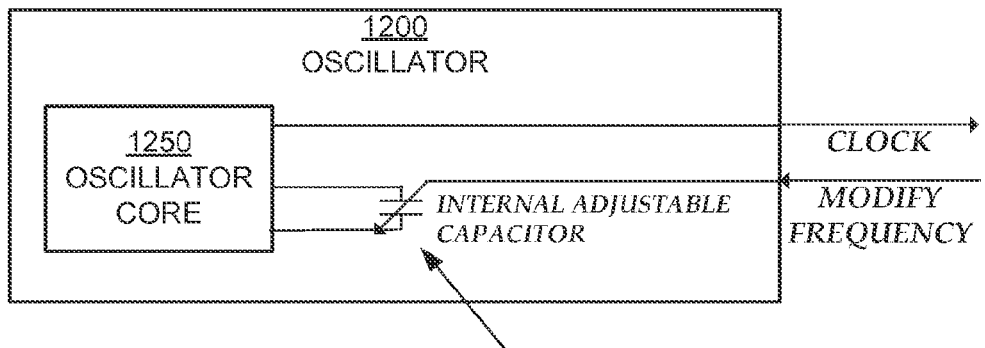
Figure 12:
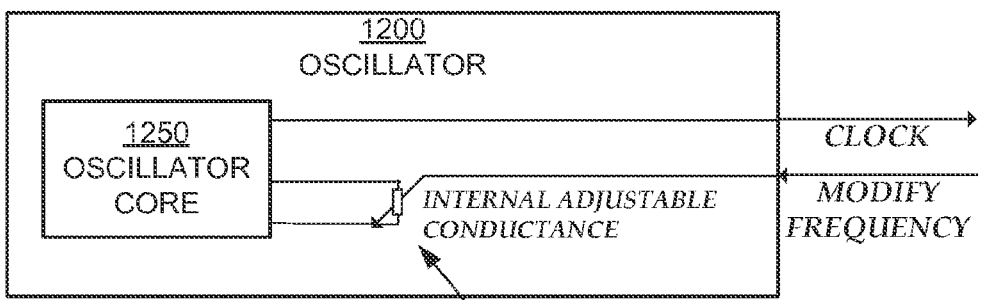
Figure 12:
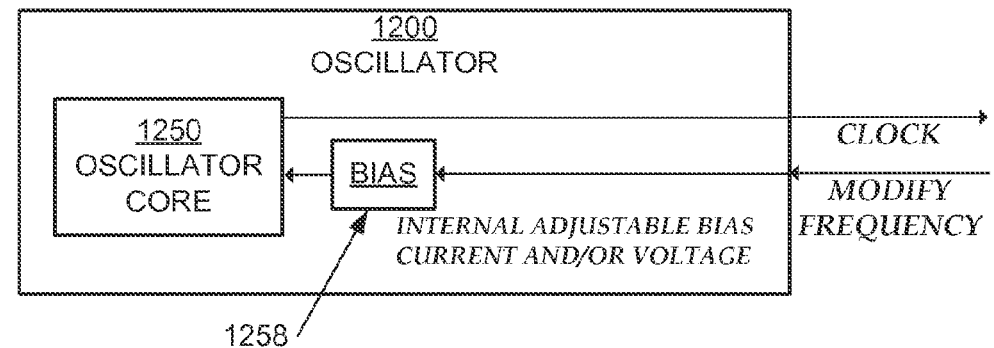

FIG. 12 illustrates several examples of circuitry for adjusting tag clock frequency according to some embodiments. Diagram 1202 depicts an example of an oscillator 1200 where the frequency generated by an oscillator core 1250 may be adjusted by using a digital divider/multiplier 1252. When an unmodified output clock frequency is desired, the direct output of the oscillator core 1250 may be selected as the output clock signal. When the output clock frequency is to be increased or reduced, an output of the digital divider/multiplier 1252 may be selected as the output clock signal. In some embodiments, the digital divider/multiplier 1252 may divide the direct output of the oscillator core 1250 as described herein in order to provide a clock signal with reduced frequency. For example, the digital divider/multiplier 1252 may divide the output of the oscillator core 1250 by using different divider ratios. In some embodiments, the digital divider/multiplier 1252 may multiply the output of the oscillator core 1250 in order to provide a clock signal with increased frequency.

Diagram 1204 depicts another example of an oscillator 1200. In diagram 1204, the frequency generated by the oscillator core 1250 may be modified by means of an internal adjustable capacitance 1254 coupled to the oscillator core 1250. When a signal to modify the output clock signal frequency is received by the oscillator 1200, the capacitance of internal adjustable capacitance 1254 may be adjusted to tune the frequency of the clock signal output by the coupled oscillator core 1250. For example, the adjustable capacitance 1254 may be adjusted by switching capacitors in and out, as described below in relation to FIG. 13, or by adjusting the capacitance of one or more capacitors in the adjustable capacitance 1254. In some embodiments, the adjustable capacitance 1254 may have or be replaced by an adjustable inductance, which may be adjusted to tune the output frequency of the oscillator 1200.

Diagram 1206 depicts yet another example of an oscillator 1200. In diagram 1206, the frequency generated by the oscillator core 1250 may be modified by means of an internal adjustable conductance 1256 coupled to the oscillator core 1250. Similar to the example depicted in diagram 1204, when a signal to modify the output clock signal frequency is received by the oscillator 1200, the conductance of the internal adjustable conductance 1256 may be adjusted to tune the frequency of the clock signal output by the oscillator 1200. For example, the adjustable conductance 1256 may be adjusted by switching resistors in and out, or by adjusting the resistance/conductance of one or more elements in the adjustable conductance 1256.

Diagram 1208 depicts another example of an oscillator 1200. In diagram 1208 the frequency generated by oscillator core 1250 may be modified by means of an internal adjustable current bias and/or voltage bias 1258 coupled to the oscillator core 1250. When a signal to modify the output clock signal frequency is received by the oscillator 1200, the current bias and/or voltage bias supplied by the bias 1258 may be adjusted to tune the frequency of the clock signal output by the oscillator 1200. For example, the current/voltage bias may be increased or decreased in response to a frequency modification signal.

In some embodiments, the methods for adjusting oscillator output frequency described above may be combined. For example, an oscillator may include two or more of a digital divider/multiplier, an adjustable internal capacitance, and an adjustable internal conductance, and the oscillator output frequency may be adjusted by adjusting the two or more included components.

Figure 13:
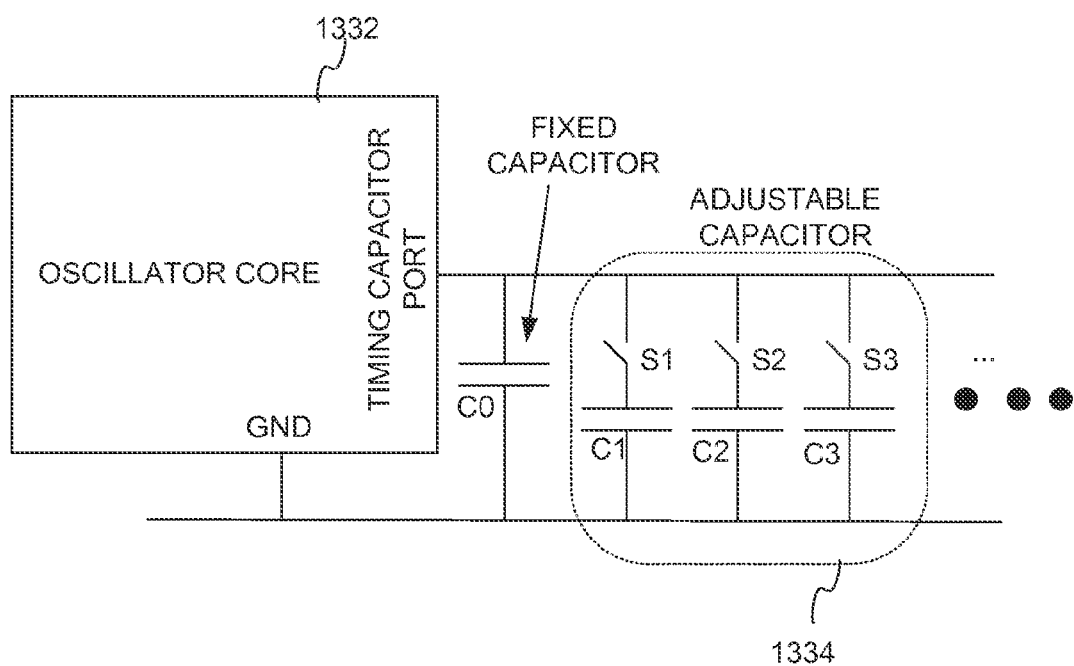
FIG. 13 illustrates example timing adjustment circuitry for adjustment of tag clock frequency according to one embodiment.

FIG. 13 illustrates example timing adjustment circuitry for adjustment of tag clock frequency according to one embodiment. Diagram 1300 includes a simplified depiction of an example timing adjustment circuit.

Oscillators where the frequency is generated partly by capacitors can be tuned by switching capacitors 1334 in and out. The controller may send the oscillator core circuit 1332 a signal to adjust frequency when the controller determines (by computing or by a look-up table) that the frequency commanded by the reader cannot be met. In response, the oscillator core circuit 1332 may switch one or more of capacitors 1334 out (to increase the frequency) or in (to decrease the frequency) as needed. When backscattering is completed, the controller may set the adjust signal back to the default value, and the oscillator may return to its original frequency.

In some embodiments, tag clock frequency may also be adjusted outside the context of a requested tag reply frequency. For example, a tag in the process of receiving a command from a reader may dynamically determine whether the command being received can be successfully processed with a reduced tag clock frequency, and if so, may dynamically decrease the tag clock frequency while the command is being received. Similarly, if no tag reply frequency is requested, a tag may independently determine whether a particular signal to be backscattered may be backscattered with a reduced tag clock frequency.

A tag may determine if a reader command can be processed (or if a signal can be backscattered) with a reduced tag clock frequency based on one or more timing parameters. The TRcal calibration symbol and divide ratio (DR) described above are examples of timing parameters. Other timing parameters may include an RTcal calibration symbol (which may indicate the time duration of the combination of a "0" symbol and a "1" symbol) and/or a Tari value (which may indicate the time duration of "0" symbol), all of which are described in the Gen2 Specification. Of course, timing parameters not recited in the Gen2 Specification may also be used to determine if tag clock frequency may be reduced.

Tag clock frequency adjustment may also have other implications for the tag. For example, if the tag clock frequency is adjusted, certain tag components (e.g., modulators and/or demodulators) may require different amounts of power to operate. A lower tag clock frequency may result in components requiring less power to operate, and a higher tag clock frequency may result in components requiring more power to operate. In these embodiments, tag clock frequency adjustments may be accompanied by adjustments to the power supplied to one or more tag components. Tag component power may be controlled by adjusting the voltage bias and/or the current bias provided to the components, with a higher bias corresponding to more power and lower bias corresponding to less power.

Figure 14:
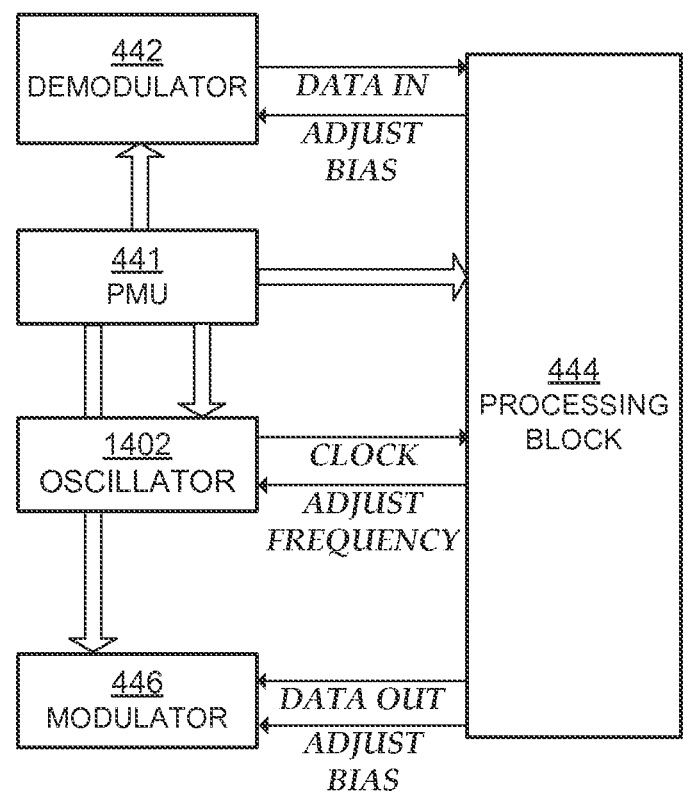
FIG. 14 is a block diagram showing how an RFID tag may operate in an adjusted-power mode according to embodiments.

FIG. 14 is a block diagram 1400 showing how an RFID tag may operate in an adjusted-power mode according to embodiments. As described herein, a tag may reduce the frequency of an oscillator 1402 in order to reduce tag power consumption. Other components in the tag or tag IC, such as the demodulator 442 and/or the modulator 446, may require less power when operating at the reduced frequency. Therefore, in some embodiments the power supplied to the demodulator 442 and/or the modulator 446 may be reduced by, for example, reducing the voltage bias and/or the current bias of the demodulator 442 and/or the modulator 446. In some embodiments, the voltage and/or current supplied to other components in the tag may also be reduced when operating at a reduced tag frequency in order to lower tag power consumption. Similarly, in some embodiments, if a tag increases the frequency of an oscillator 1402 (e.g., to process an incoming signal or to achieve a desired BLF), the voltage and/or current supplied to other components in the tag may be increased.

Tag clock frequency adjustment may also affect one or more counters implemented on the tag IC. For example, a tag may use counters to track time and/or to determine the time duration of a received reader command. If tag counters increment (or decrement) based on the number of edges in the tag clock, modifying the tag clock frequency may also modify the counting rates of tag counters. These counting rate changes may be significant, especially if tag clock frequency adjustments are large.

Figure 15:
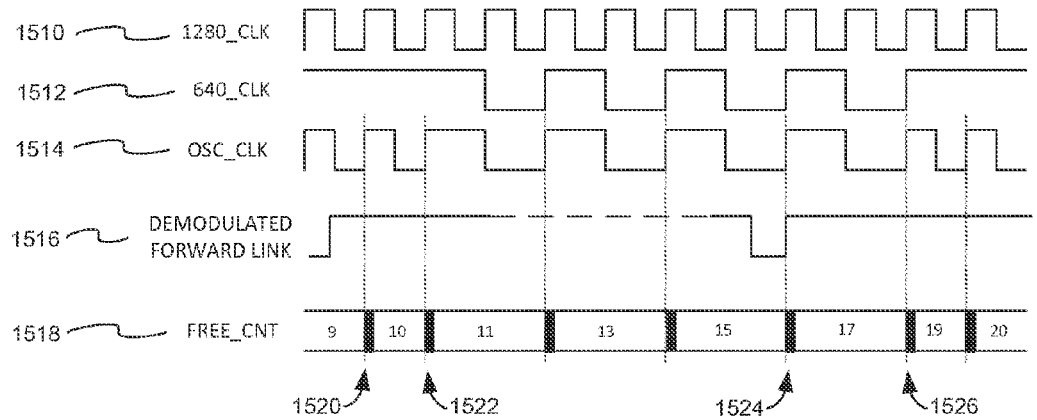
FIG. 15 illustrates various signals in an RFID tag during tag clock frequency adjustment for forward and reverse links according to embodiments.
Figure 15:
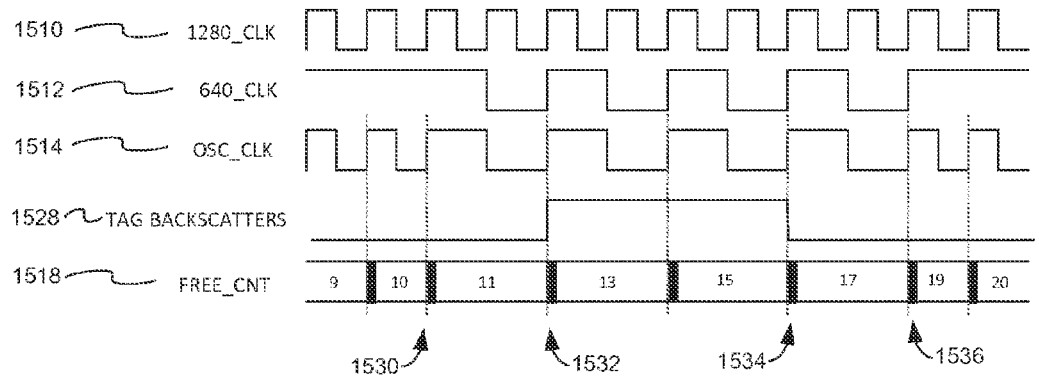

FIG. 15 illustrates various signals in an RFID tag during tag clock frequency adjustment for forward and reverse links according to embodiments. Diagram 1502 depicts tag signals related to clock frequency adjustment during a forward link process, where a tag receives a signal from a reader. Full clock signal 1510 depicts the unmodified clock signal (e.g., the clock signal directly output by the oscillator core). Adjusted clock signal 1512 depicts a clock signal whose frequency is half that of the full clock signal 1510 (i.e., the full clock signal 1510 divided by 2). In other embodiments, the full clock signal 1510 may be divided by other integers or numbers. Oscillator clock signal 1514 depicts the signal actually output by the oscillator (e.g., oscillator 1200 in FIG. 12) at a given time. Demodulated forward link signal 1516 may indicate when the forward link is active (i.e., when a data signal is being transmitted from a reader to the tag). Free counter signal 1518 may track the amount of time that has passed for use in decoding received symbols. In some embodiments, the free counter tracks time by counting the number of rising (or falling) edges in the oscillator clock signal 1514, as indicated by the numerals in the free counter signal 1518.

In diagram 1502, the tag oscillator initially provides an unmodified clock signal operating at full frequency (shown as oscillator clock signal 1514 having the same frequency as full clock signal 1510). When an incoming data signal is detected at time 1520, the tag determines if the data signal decoding process is operable with a lower clock frequency. If so, clock frequency adjustment may be enabled at time 1522, resulting in a frequency reduction in the oscillator clock signal 1514 (shown as clock signal 1514 having the same frequency as adjusted clock signal 1512). At the same time, the counting rate of the free counter signal 1518 may be adjusted to account for the reduced frequency. Since the free counter tracks time based on edges in the oscillator clock signal 1514, when the frequency of signal 1514 is reduced, the counting rate of the free counter may be increased to compensate. For example, in diagram 1502, when the frequency of signal 1514 is halved, the counting rate of the free counter may be doubled. Thus, the free counter continues to count at a constant rate with respect to time.

At time 1524, the end of the incoming data signal may be received. As a result, clock frequency adjustment may be disabled (and the counting rate of the free counter decreased) at time 1526, allowing the tag to operate at the full clock frequency in order to process subsequent incoming signals. In some embodiments, there may be a waiting period between receiving the end of the incoming data signal and disabling the clock frequency adjustment.

Diagram 1504 depicts tag signals related to clock frequency adjustment during a reverse link process, where a tag backscatters a signal. Most of the tag signals depicted in diagram 1504 are similar to those depicted in diagram 1502, and are numbered similarly. Before the tag begins to backscatter, the tag determines if an adjusted frequency should be used for the backscatter process with a lower clock frequency. If so, clock frequency adjustment may be enabled at time 1530, resulting in a frequency reduction in the oscillator clock signal 1514 (shown as clock signal 1514 having the same frequency as adjusted clock signal 1512). At the same time, the counting rate of the free counter signal 1518 may be adjusted to account for the reduced frequency, as described above. At time 1532, the tag may begin to backscatter a signal, as indicated by tag backscatter signal 1528. Subsequently, when the tag finishes backscattering at time 1534, the clock frequency adjustment may be disabled (and the counting rate of the free counter decreased) at time 1536, allowing the tag to operate at the full clock frequency in order to receive or backscatter subsequent signals.

Optionally, instead of (or in addition to) adjusting the counting rate of one or more counters to compensate for different clock signal frequencies, the limits (or expiration time) of counters may be adjusted. In some embodiments, one or more counters may be used to track when certain operations are to be performed, and/or the time duration of certain operations. In these instances, if the clock signal frequency is adjusted, the limits of the counter(s) may also be adjusted. For example, suppose a counter is used to control the expiration time of a particular operation performed by a tag. The counter may count down from a high limit to a low limit by detecting clock signal edges and terminate the operation when the low limit is reached. If the clock signal frequency is reduced, instead of increasing the counter counting rate, the counter high limit may be increased (and/or the counter low limit decreased). Thus, even though the clock frequency is reduced and the counter still counts at the same rate, the same expiration time duration is still measured due to the change in limits.

Figure 16:
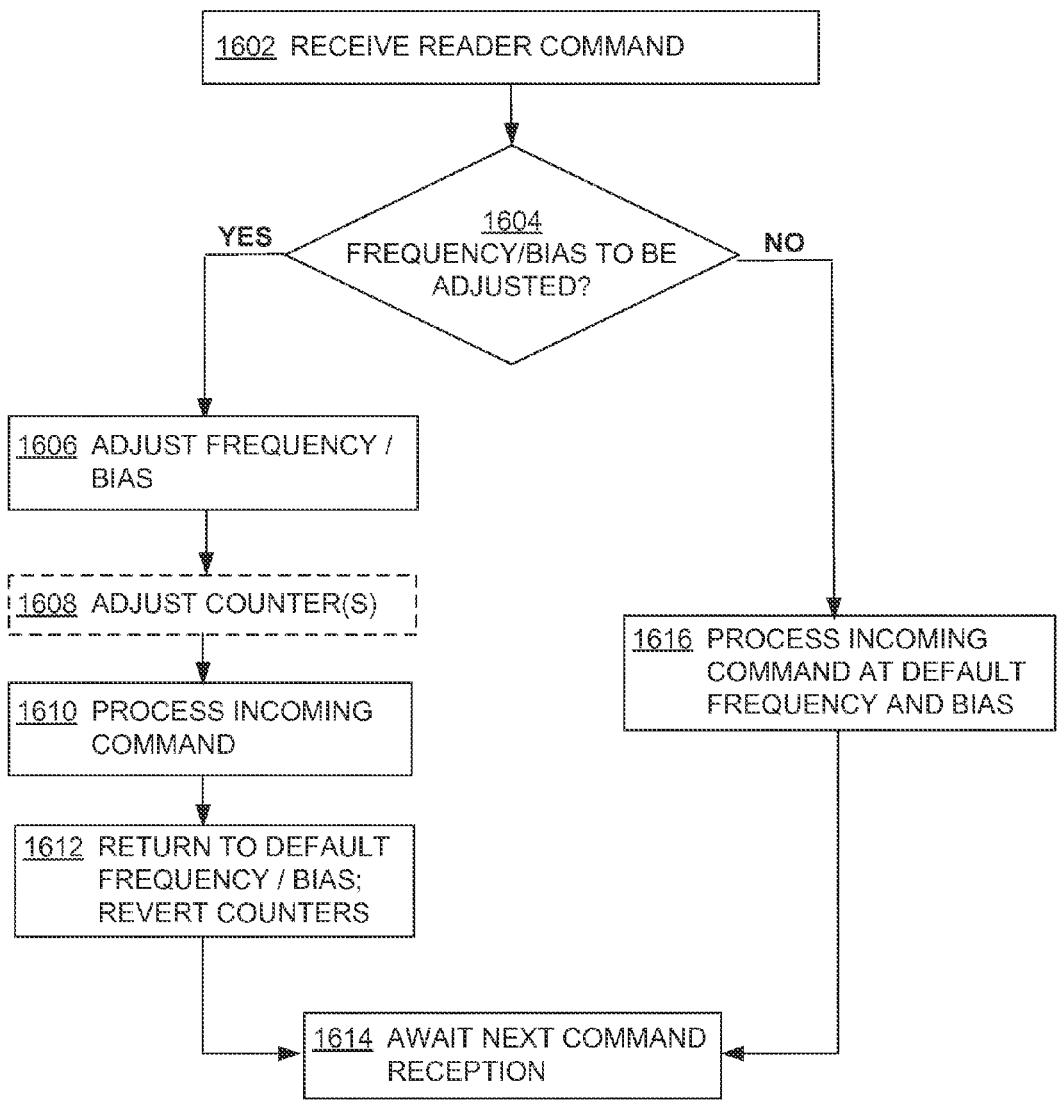
FIG. 16 depicts a process for adjusting tag clock frequency during a forward link according to embodiments.

FIG. 16 depicts a process 1600 for adjusting tag clock frequency during a forward link according to embodiments. Process 1600 begins when a tag receives a reader command in step 1602. In step 1604, the tag may determine if the received reader command can be processed with an adjusted clock frequency. In some embodiments, the determination may be performed based on one or more timing parameters. For example, the tag may measure the length of one or more timing parameters in the reader command (e.g., a TRcal symbol, an RTcal symbol, a Tari value, a divide ratio, or any other suitable symbol or parameter) with a counter (e.g., a free counter as described above in relation to FIG. 16) in order to determine a symbol length in terms of counter cycles. The reader may then compare the measured symbol length to a symbol decision threshold. If the measured symbol length is greater than the symbol decision threshold (i.e., the measured symbol length spans more counter cycles than the symbol decision threshold does), then the reader may determine that the reader command may be processed with a reduced clock frequency. In other embodiments, the tag may determine based on one or more timing parameters that the tag clock frequency should be increased in order to process the incoming signal successfully.

In some embodiments, the tag may also determine if the received reader command can be processed with one or more components in the tag operating with reduced power (indicated by voltage bias and/or current bias). If the tag determines that the received reader command cannot be processed with a reduced clock frequency and/or reduced component power, the tag proceeds to step 1616, where it may process the incoming reader command at the default clock frequency, with no change to component power. Subsequently, the tag proceeds to step 1614, where it may await the next incoming command.

On the other hand, if in step 1604 the tag determines that the received reader command can be processed with a reduced tag clock frequency and/or reduced power to one or more components, or should be processed with a higher tag clock frequency and/or higher power to one or more components, in step 1606 the tag may proceed to adjust the clock frequency and/or power supplied to one or more components. In some embodiments, the tag may adjust the clock frequency and/or component power by adjusting tag circuitry as described in FIGS. 11-14. The tag may also adjust the counting rate and/or limits of one or more counters in optional step 1608 to account for the adjusted clock frequency. For example, in some embodiments, the tag may adjust the counting rate of a counter such as the free counter described in FIG. 15. The tag may then process the incoming command at the modified frequency/bias at step 1610. Once the command has been processed, in step 1612 the tag may then return to operating at the default clock frequency and supplying the default power to the one or more components. If the counting rate/limits of one or more counters were modified in optional step 1608, in step 1612 the tag may also adjust the modified counting rates/limits to the original counting rates/limits. In some embodiments, the tag may instead adjust the modified counting rates/limits to values different from the original counting rates/limits. The tag may then proceed to step 1614, where it may await the next incoming command.

Figure 17:
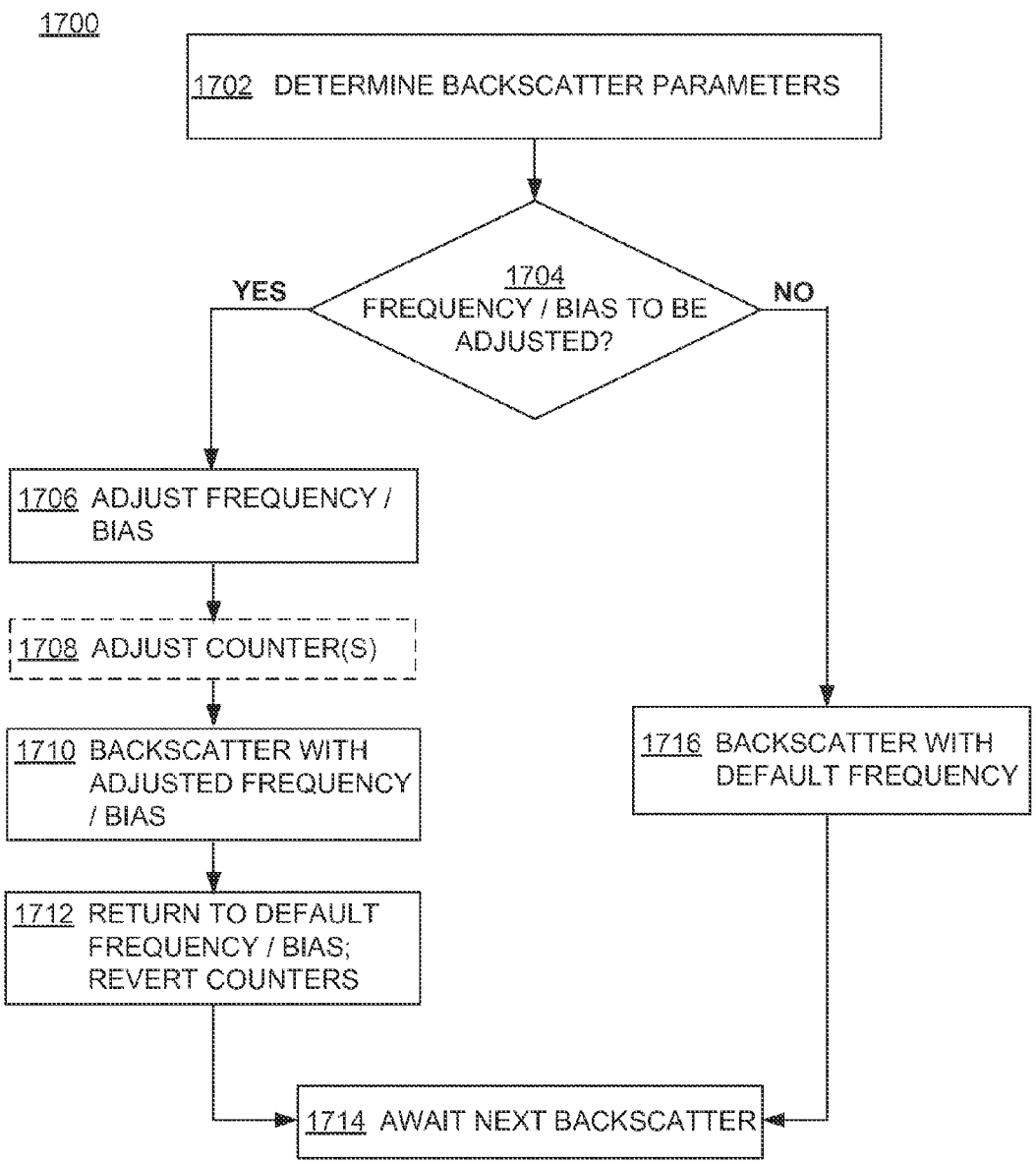
FIG. 17 depicts a process for adjusting tag clock frequency during a reverse link according to embodiments.

FIG. 17 depicts a process 1700 for adjusting tag clock frequency during a reverse link according to embodiments. In step 1702, a tag may determine that a signal is to be backscattered, and one or more backscatter parameters are determined. The backscatter parameters may be similar to the timing parameters described above in relation to FIG. 16. In some embodiments, the backscatter parameters may include a backscatter link frequency (BLF), which may be determined as described above. Based on the determined backscatter parameters, in step 1704 the tag may determine if frequency and/or bias should be adjusted for the backscatter process (i.e., if the backscatter can be performed with a lower tag clock frequency/lower power to one or more tag components, or if the backscatter should be performed with a higher tag clock frequency). If not, the tag may then perform the backscatter at the default, original clock frequency in step 1716. Subsequently, the tag may proceed to step 1714 to await the next signal to be backscattered.

If, in step 1704, the tag determines that the backscatter can be performed with a lower tag clock frequency and/or with lower power to one or more tag components, or should be performed with a higher tag clock frequency and/or higher tag component power, in step 1706 the tag proceeds to adjust the tag clock frequency and/or adjust the power provided to one or more tag components. Similar to step 1606 described above in relation to FIG. 6, in some embodiments the tag may adjust the tag clock frequency and/or component power by adjusting tag circuitry as described in FIGS. 11-14. In optional step 1708, the tag may also adjust the counting rates/limits of one or more tag counters to compensate for the adjusted tag clock frequency/adjusted tag component power. For example, in some embodiments the tag may adjust the counting rate of a counter such as the free counter described in FIG. 15. The tag then performs the backscatter with the adjusted clock frequency and component power in step 1710. When the backscatter is complete, in step 1712 the tag may readjust the adjusted clock frequency to the original, default clock frequency and readjust the power supplied to any tag components whose power was adjusted in step 1706. If tag counters were adjusted in optional step 1708, in step 1712 the tag may also revert the adjusted tag counting rates/limits back to their original values. Subsequently, the tag may proceed to step 1714 to await the next signal to be backscattered.

It should be noted that embodiments are not limited to the example circuits discussed above. Tag clock frequency adjustment based on determining whether or not a tag reply frequency based on the current tag clock frequency meets a predefined limit may be implemented using any other controller or oscillator circuit known in the art.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. A method for a Radio Frequency Identification (RFID) tag to dynamically adjust a frequency of a clock oscillator, the method comprising:
   receiving, from a reader, values for two or more of a TRcal, an RTcal, a DR, a Tari, and a BLF;
   calculating a first symbol duration based on the received values;
   comparing the calculated first symbol duration to a symbol decision threshold;
   determining, based on the comparison, whether the frequency can be reduced;
   if so then:
      adjusting a counting rate of a counter;
      reducing the frequency by adjusting at least one of a divide ratio, bias, resistance, capacitance, and inductance of the clock oscillator;
      calculating a second symbol duration based on the reduced frequency; and
      if necessary to meet error limits of a protocol, then adjusting at least one of the second symbol duration and the reduced frequency such that the second symbol duration meets the error limits; and
   if not then:
      not adjusting the counting rate of the counter, and not reducing the frequency.

2. The method of claim 1, wherein adjusting the resistance comprises at least one of switching a resistor in or out and adjusting an adjustable resistor.

3. The method of claim 1, wherein adjusting the capacitance comprises at least one of switching a capacitor in or out and adjusting an adjustable capacitor.

4. The method of claim 1, wherein adjusting the inductance comprises at least one of switching an inductor in or out and adjusting an adjustable inductor.

5. The method of claim 1, further comprising subsequently restoring the frequency.

6. The method of claim 1, further comprising adjusting a limit of a tag counter.

7. A Radio Frequency Identification (RFID) integrated circuit (IC) configured to dynamically adjust a frequency of a clock oscillator, the IC comprising:
a transceiver configured to communicate with a reader; and
a processing block coupled to the transceiver and configured to:
receive, from the reader, values for two or more of a TRcal, an RTcal, a DR, a Tari, and a BLF;
calculate a first symbol duration based on the received values;
compare the calculated first symbol duration to a symbol decision threshold;
determine, based on the comparison, whether the frequency can be reduced;
if so, then:
adjust a counting rate of a counter;
reduce the frequency by adjusting at least one of a divide ratio, bias, resistance, capacitance, and inductance of the clock oscillator;
calculate a second symbol duration based on the reduced frequency; and
if necessary to meet error limits of a protocol, then adjust at least one of the second symbol duration and the reduced frequency such that the second symbol duration meets the error limits; and
if not then:
not adjusting the counting rate of the counter; and
not reducing the frequency.

8. The IC of claim 7, wherein the resistance is adjusted by at least one of switching a resistor in or out and adjusting an adjustable resistor.

9. The IC of claim 7, wherein the capacitance is adjusted by at least one of switching a capacitor in or out and adjusting an adjustable capacitor.

10. The IC of claim 7, wherein the inductance is adjusted by at least one of switching an inductor in or out and adjusting an adjustable inductor.

11. The IC of claim 7, wherein the processing block is further configured to subsequently restore the frequency.

12. The IC of claim 7, wherein the processing block is further configured to adjust a limit of a tag counter.

13. A Radio Frequency Identification (RFID) tag comprising:
an antenna; and
an RFID integrated circuit coupled to the antenna and configured to:
receive, using the antenna, values for two or more of a TRcal, an RTcal, a DR, a Tari, and a BLF;
calculate a first symbol duration based on the received values;
compare the calculated first symbol duration to a symbol decision threshold;
determine, based on the comparison, whether a frequency of a clock oscillator can be reduced;
if so, then:
adjust a counting rate of a counter;
reduce the frequency by adjusting at least one of a divide ratio, bias, resistance, capacitance, and inductance of the clock oscillator;
calculate a second symbol duration based on the reduced frequency; and
if necessary to meet error limits of a protocol, then adjust at least one of the second symbol duration and the reduced frequency such that the second symbol duration meets the error limits; and
if not then:
not adjusting the counting rate of the counter; and
not reducing the frequency.

14. The tag of claim 13, wherein the resistance is adjusted by at least one of switching a resistor in or out and adjusting an adjustable resistor.

15. The tag of claim 13, wherein the capacitance is adjusted by at least one of switching a capacitor in or out and adjusting an adjustable capacitor.

16. The tag of claim 13, wherein the inductance is adjusted by at least one of switching an inductor in or out and adjusting an adjustable inductor.

17. The tag of claim 13, wherein the RFID integrated circuit is further configured to subsequently restore the frequency.

18. The tag of claim 13, wherein the RFID integrated circuit is further configured to adjust a limit of a tag counter.

* * * * *